Patented Feb. 4, 1930

1,745,367

UNITED STATES PATENT OFFICE

JOHN C. HEBDEN, OF NEW YORK, N. Y., ASSIGNOR TO HEBDEN SUGAR PROCESS CORPORATION, OF NEW YORK, N. Y.

PURIFICATION OF VEGETABLE OILS

No Drawing.    Application filed April 2, 1923.    Serial No. 629,532.

The present invention relates to the purification of vegetable oils, and its object is to provide a novel and improved process for this purpose which can be carried out with facility and inexpensively and which is capable of producing a vegetable oil which is of superior quality and is substantially free from foots.

The vegetable oils are obtained from fruits, nuts and seeds by various processes, particularly by extraction in presses of various types in order to separate the oily constituents from the other components of the fruits, seeds or nuts. By these processes there is produced an oily substance containing more or less débris and moisture derived from the source of oil and a cake containing a small percentage of oil and the constituents not fatty substances contained in the oil bearing fruit, seed or nut.

The oils produced by the above described process consist mainly of fixed oils and a small percentage of substances derived from the fruit, seeds or nuts. These substances are defined as protein substances, carbohydrates, fibrous material, moisture and ash forming constituents. They are all removed in the mechanical treatment of the oil bearing substance in order to separate the oil from the fruit, seed or nut.

The crude oil as produced according to the above description is not fit for consumption either as an edible oil or for use in the arts. It is therefore necessary to subject it to a refining operation or a treatment to remove the subtsances not fixed or neutral oils or free fatty acid derived therefrom. These treatments consist either of a sedimentation whereby the impurities are allowed to settle and are separated as foots, or a chemical treatment with caustic soda or a substitute therefor which combines with the free fatty acid and at the same time precipitates or carries down the non-oleagenous substances. Sometimes the oils are subjected to a filtration through fuller's earth or similar substances, in order to separate the protein substances, carbohydrates and fibrous material.

If the oils are treated by sedimentation in order to remove the foots, it is generally necessary to subject them to a refining operation to decolorize and further clarify and to remove the fatty acids. If the oils are treated with caustic soda or similar substance, it is generally necessary to subsequently treat the oil in order to remove the soaps that may be formed and to improve the flavor and color of the product. Treatments with fuller's earth and similar substances have no action upon the free fatty acids, and while color may be removed, a subsequent refining operation is necessary in order to make an edible product.

The present invention offers a process for producing a purified and edible oil consisting of neutral oils and the accompanying free fatty acids by a method which not only removes color, but does not react upon the oily substances nor the free fatty acids, and at the same time removes the substances which may be defined as protein substances, carbohydrates, fibre and ash forming substances.

The substances which are retained by the oil in the process of manufacture of the crude oil have been termed generally as protein substances, carbohydrates, fibrous material and ash forming constituents. These substances are associated with the water which is expressed from the source of the oil and is present in the oil as moisture. The protein and carbohydrate substances are in a fine state of division and are sometimes referred to as mucilage on account of the gummy nature of some of the substances.

It has been found that basic tannates of metals which have the properties of coagulating and precipitating proteins and gums and similar substances, when suspended in water, can be intermixed with oils and that the intermixture thus produced can be made to yield a pure brilliant oil substantially free from non-oleagenous substances, either by sedimentation or by the use of a mechanical separation, as for instance, centrifugal force.

The tannates of metals which may be used in suspension in water to be intermixed with the crude vegetable oil are the basic tannates of those metals which form insoluble compounds with tannic acid. It is preferable to use the tannates of iron, aluminum or titanium because of their non-poisonous properties and because these substances have no reaction upon the free fatty acids.

These substances may be prepared substantially in the manner fully described in my Patents Nos. 1,545,318 and 1,545,319, granted July 7, 1925, to which reference is made for a detailed description of the methods which may be used for preparing them.

In carrying out the invention, the coagulant selected is suspended in water, and the oil is intermixed at ordinary temperature (about 70° F.) with about 10% of the volume of the oil of the insoluble coagulant in aqueous suspension. The coagulant which, for example, may be basic tannate of alumina, is used in sufficient amount to coagulate or remove the impurities, as for example, an aqueous suspension containing one hundredth of one per cent of basic tannate of alumina. The intermixture produced is either allowed to settle to free the oil from the water and suspended matter, or it is preferably separated by a centrifugal machine.

This process offers a method for producing an oil substantially free from foots by the use of chemical substances which have no reaction either upon the neutral oil or the free fatty acids. As the coloring matters in the oils vary in character and in properties, the degree of removal of color will vary with the character of the oils, but as the substances used are mordants for both basic and mordant dyeing coloring matters, an average of about 50% of the coloring matters which are in the oils belonging to the two classes above mentioned are removed when the oil is treated at the ordinary temperature. By increasing the temperature during the treatment, a further removal of coloring matters may be obtained, but as the coagulation of the protein and carbohydrate substances is more important than the removal of color in this particular treatment, it is desirable to keep the temperature low and insure the removal of the protein and carbohydrate substances completely. The oil can then subsequently be treated for the removal of color and the removal of any free fatty acid if desired.

The rancidity of vegtable oils is frequently attributed to the presence of free fatty acid. In working the above method for purifying vegetable oils, it has been noted that a sweet fine-flavored product is obtained by the above described method without a treatment to remove free fatty acid, leading to the conclusion that rancidity is more probably due to fermentation or decomposition of protein bodies and carbohydrates in the presence of moisture in the oil than to the presence of a large amount of free fatty acid, and that the increase observed in the percentage of free fatty acid in oils during storage is due to the above described decomposition of fermentation.

The above process may be termed a process for removing foots from vegetable oils. The oils therefore after having been treated by the above process can be subjected to a treatment for further removing color and for removing free fatty acid. In some cases combination of such treatments may be desirable, but it appears that a better product is usually obtained by first removing the foots by the process described above, and then further removing color, free fatty acid or other impurities in a subsequent operation. By adopting this procedure, the action of the caustic soda or other suitable substance used for removing free fatty acid upon the protein bodies or carbohydrates is avoided, and the possibility of the formation of impurities which are more difficult to remove than the original impurities is prevented.

I claim as my invention:—

1. The steps in the process of purifying vegetable oils which comprise intermixing such an oil with water containing a basic tannate of a metal, at a temperature at which the neutral oil will not be reacted upon, and removing the water and the resulting precipitate from the oil.

2. The process of purifying vegetable oils which comprises intermixing such an oil with water containing basic tannate of alumina, at a temperature at which neither the neutral oil nor the fatty acids will be reacted upon, and removing the water and the resulting precipitated foots from the oil.

In testimony whereof I have hereunto set my hand.

JOHN C. HEBDEN.